(12) United States Patent
Schneider et al.

(10) Patent No.: US 10,104,206 B2
(45) Date of Patent: Oct. 16, 2018

(54) NETWORK MODULE FOR SENDING AND/OR RECEIVING OF DATA PACKAGES FROM A NETWORK ARRANGEMENT AND METHOD

(71) Applicant: Airbus Defence and Space GmbH, Taufkirchen (DE)

(72) Inventors: Ulrich Schneider, Sulzberg (DE); Jürgen Meilinger, Wolnzach (DE)

(73) Assignee: Airbus Defence and Space GmbH (DE)

( * ) Notice: Subject to any disclaimer, the term of this patent is extended or adjusted under 35 U.S.C. 154(b) by 140 days.

(21) Appl. No.: 15/245,722

(22) Filed: Aug. 24, 2016

(65) Prior Publication Data

US 2017/0064049 A1    Mar. 2, 2017

(30) Foreign Application Priority Data

Aug. 26, 2015 (DE) .................. 10 2015 010 969

(51) Int. Cl.
*H04L 29/12* (2006.01)
*H04L 29/06* (2006.01)
*H04L 12/933* (2013.01)
*H04L 29/08* (2006.01)
(Continued)

(52) U.S. Cl.
CPC .......... *H04L 69/22* (2013.01); *H04J 14/0268* (2013.01); *H04J 14/0283* (2013.01);
(Continued)

(58) Field of Classification Search
CPC ......... H04L 29/06; H04L 29/12; H04L 29/08; H04L 12/933; H04L 69/22; H04L 49/102
See application file for complete search history.

(56) References Cited

U.S. PATENT DOCUMENTS 6,426,962 B1 * 7/2002 Cabezas .................. H04L 1/205
                                                                 370/516
6,925,088 B1    8/2005 Moreaux
(Continued)

FOREIGN PATENT DOCUMENTS

EP    1 100 230 B1    6/2006
EP    2 506 511 A1    10/2012

OTHER PUBLICATIONS

EP 16185101.9 European Search Report dated Dec. 13, 2016.
(Continued)

*Primary Examiner* — Wei Zhao
(74) *Attorney, Agent, or Firm* — Lerner, David, Littenberg, Krumholz & Mentlik, LLP

(57) ABSTRACT

A network module for sending and/or receiving of data packages from a network arrangement located in a network with ring structure, wherein the data package includes at least one data package segment, a source address, a destination address and an identification number. The network module includes a first network interface and a second network interface, for receiving and/or sending of data packages via the ring structure, a processor configured to determine, based on the destination address, if data packages received are directed to the network module and to determine if the source address and/or the destination address are contained in a predefined list of the network participants, to determine, based on the source address and the identification number, if a copy of a data package directed to the network module is already created in a memory, to create a copy of the data package in the memory.

14 Claims, 7 Drawing Sheets

(51) Int. Cl.
  *H04J 14/02* (2006.01)
  *H04L 12/437* (2006.01)
  *H04L 12/46* (2006.01)

(52) U.S. Cl.
  CPC ........ *H04L 12/437* (2013.01); *H04L 12/4625* (2013.01); *H04L 49/102* (2013.01); *H04L 61/6063* (2013.01); *H04L 67/1095* (2013.01); *H04L 67/12* (2013.01); *H04L 69/32* (2013.01); *H04L 69/321* (2013.01); *H04L 61/6022* (2013.01)

(56) References Cited

U.S. PATENT DOCUMENTS

| | | | |
|---|---|---|---|
| 2011/0103268 A1 | 5/2011 | Mann et al. | |
| 2011/0116508 A1 | 5/2011 | Kirrmann | |
| 2013/0170435 A1* | 7/2013 | Dinan | H04L 45/50 370/328 |
| 2013/0223204 A1 | 8/2013 | Angst et al. | |
| 2014/0245435 A1* | 8/2014 | Belenky | H04L 63/1458 726/22 |

OTHER PUBLICATIONS

Heine & Kleineberg, The High-Availability Seamless redundancy protocol (HSR): Robust fault-tolerant networking and loop prevention through duplicate discard, In: 9th IEEE International Workshop on Factory Communication Systems (WFCS), 2012, (pp. 213- 222) ISBN 978-1-4673-0693-5.
Office Action (DE 10 2015 010 969.3) dated Jun. 22, 2016.
Norm DIN EN 61439-3 2013-06-00. Industrielle Kommunikationsnetze—HochverfOgbare Automatisierungsnetze—Teil 3: Parallelredundanz-Protokoll (PRP) and nahtloser HochverfOgbarkeits-Ring (HSR) (IEC 62439-3 : 2012) (English Version—Industrial Communication Networks—High Availability Automation Networks) Sep. 2012.
Kirrmann, Hubert, ABB Switzerland Ltd, Corporate Research: Highly Available Automation Networks Standard Redundancy Methods—Rationales behind the IEC 62439 standard suite. 2012. URL: http://lamspeople.epfl.ch/kirrmann/Pubs/IEC 62439-1IIEC 62439_Summary.pdf <http://lamspeople.eptch/kirrmann/Pubs/IEC_62439-1IIEC_62439_Summary_pdf>[abgerufen am Jun. 17, 2016].

* cited by examiner

NETWORK MODULE FOR SENDING AND/OR RECEIVING OF DATA PACKAGES FROM A NETWORK ARRANGEMENT AND METHOD

FIELD OF THE INVENTION

Various embodiments generally relate to a network module for sending and/or receiving of data packages from a network arrangement as well as a corresponding method.

BACKGROUND OF THE INVENTION

For data communication in an airplane it is required, for example, that components of the communication system which should transmit safety-critical information, too, are designed to be (single or multiple) redundant and deterministic, among other things. Safety-critical information is such information which are safety-critical for operation of an airplane, for example, and, hence, are of substantial significance. For example, information about the remaining amount of kerosene or, for example, the flight altitude is of substantial significance in an airplane. Whereas information which are necessary for navigation or a mission, for example waypoints, are of secondary relevance for the actual safety of the airplane. The number of sensors, radar, cameras and other electronic components and the amount of data which is transmitted between the single components is continuously growing in modern airplanes. Hereby, conventional data networks which are approved for airplanes reach their limits. Implementation of an Ethernet communication network in an airplane for transmission of safety-critical information is not possible even if the Ethernet communication network enables sufficient data transmission, as a conventional Ether network is typically not designed redundantly and does not provide determinism, among other things, i.e., cannot be approved for airplane for specific safety-critical operations. Furthermore, known communication devices for airplane, as for example ADFX (Avionics Full Duplex Switched Ethernet)—networks, do not provide sufficient transmission rate currently.

BRIEF SUMMARY OF THE INVENTION

Starting therefrom, there may be a need to provide a device which avoids the aforementioned drawbacks.

A network module for sending and/or receiving of data packages from a network arrangement is provided. The network arrangement is provided in a network with ring structure. The data package comprises at least one data package segment, a source address, a destination address and an identification number. The network module comprises a first network interface for receiving and/or sending of data packages via the ring structure. Furthermore, the network module comprises a second network interface for receiving and/or sending of data packages via the ring structure. The network module further comprises a processor. The processor is configured to determine, based on the destination address, if data packages received with the first and/or second network interface are directed (i.e., addressed) to the network module. The processor is further configured to determine if the source address and/or the destination address are contained in a predefined list of network participants. The processor is further configured to determine, based on the source address and the identification number, if a copy of a data package directed to the network module is already created in a memory. The processor is further configured to create a copy of the data package as well as the source address and the identification number in the memory if the determination results in that the received data package is directed to the network module and a copy of the data package has not yet been created in the memory. The processor is further configured to unpack the data package segment comprising at least one header and a payload from the created copy of the data package and to provide the data package segment to an application.

It is one aspect to provide a certifiable network module which is redundant and does not work deterministically. However, the network module is bound to the network module independent from an application. This is substantially achieved as a result of the network module being connected to a ring structure via a first and a second network interface and receiving data packages redundantly via these network interfaces. Here, all network arrangements of the network are known to the network module. For this purpose, a processor of the network module undertakes substantial tasks. An approvable network device which provides sufficient transmission rate is provided by the network module described herein.

The term "network module" may be understood as any module in a communication network which is suitable for processing data of a network, i.e., receiving, sending, forwarding, and/or processing in another manner. The term "network arrangement" may be understood as any arrangement in a communication network, for example an additional network module or another arrangement in a network for data communication via the network.

The term "data package" may be understood as any composition of data according to a network protocol, wherein the data package comprises at least one payload and an indefinite number of headers.

The term "data package segment" may be understood as any composition of data according to a network protocol, wherein the "data package segment" comprises at least one payload and an indefinite number of headers.

The herein used terms "data package", "data", or "data package segment" which are used throughout the layers of the OSI reference model should be understood in the meaning of the OSI reference model as "bits" for layer 1, "frames" (or framework) for layer 2, "packages" for layer 3, "segments" for layer 4, and "data" for layers 5 to 7.

The terms "source address" and "destination address" may be understood as any type of identifier for unambiguous identification of a participant in a network.

The term "identification number" may be understood as any type of identifier for unambiguous identification of a data package, for example an unambiguous check indicator or the like.

The term "network" may be understood as communication network or data network for exchange of data between two or more participants of the network. The term "ring structure" may be understood as a network built up in a ring-like manner which has a substantially closed ring-like network structure. Typically, the participants of the ring structure are directly connected to the ring structure. The term "network interface" may be understood as communication interface for exchange of data with the connected network.

The term "processor" may be understood as any kind of logic implementing entity which comprises hardware, software, firmware or any combination therefrom. Hence, in one embodiment, a processor may be a hard-wired logic circuit or a programmable logic circuit as, for example, a programmable processor, for example a microprocessor (for example a CISC (Complex Instruction Set Computer) processor, a RISC (Reduced Instruction Set Computer) processor), or an ASIC (Application Specific Integrated Circuit). The processor may also execute software, for example any kind of computer program which uses a code as, for example, Verilog-code or VHDL, or a virtual machine as, for example, Java. The functions of the processor described herein may be executed by a single processor or by multiple identical or different processors. Thereby, separation of the single functions may be chosen almost arbitrarily, as far as this makes sense technically.

Preferably, the processor is a DAL-A and/or a DAL-B safety certified processor. For example, five safety levels, also referred to as DAL (Design Assurance Level) levels DAL A to DAL E, are used in aviation. The various levels are defined by guidelines for certification of avionics software. Here, DAL-A indicates "catastrophic" impacts to the airplane in case of a failure up to DAL-E "no impacts". Safety of the airplane may be compromised more or less depending on the functions which shall be fulfilled by a software or a hardware. Different requirements are posed to the design process depending on the compromise impacts. However, only a limited number of processors can be used as DAL-A and/or DAL-B processors. For example, usage of multicore processors for a DAL-A or DAL-B critical application is typically possible only very limited or not possible at all as these processors often do not have the required safety, predictability and the required determinism at all or in a very limited manner only. For example, the processor is an FPGA (Field Programmable Gate Array) processor.

As predefined list of network participants, a list is to be understood which unambiguously identifies all participants of a network based on their network address, for example their MAC-address. This list with all participants is known to the network module or is loaded into a memory area of the network module prior to usage.

Here, the term "memory" substantially refers to any kind of memory which can receive and store data. In general, the memory corresponds with memory which can be used by a computer processor or within a computer system, for example. In particular, as defined herein, memory refers to any kind of memory which can be accessed during operation of the processor which uses the memory in a writing or a reading manner. For example, the memory may comprise a direct access memory (Random Access Memory or RAM). The RAM may be static RAM (SRAM), for example. Other types of memory comprise, without being limited thereto, dynamic direct access memory (Dynamic Random Access Memory or DRAM) and various memory designs which are based on latches, flip-flops and other bi-stable constructions (for example Memristors).

According to the OSI reference model, the following layers are provided for provision of the entire communication between two application server programs which are typically executed on two computers being coupled with each other via the Internet: layer 1: physical layer, layer 2: data link layer, layer 3: network layer, layer 4: transport layer, layer 5: session layer, layer 6: presentation layer, and layer 7: application layer, also referred to as processing layer.

The term "application" may be understood in this context as application layer or processing layer. Vividly, the application layer is that layer in which data of a data transmission or data teleprocessing are directly provided to a user. In the application layer, programs are provided which may be referred to as application server programs in the following and which make use of the services provided by the layers arranged below for transmission.

According to a further embodiment of the network module, the processor is furthermore configured to forward a data package received by the first network interface via the second network interface on the ring structure and/or to forward a data package received by the second network interface via the first network interface on the ring structure if it is determined that the source address of the data package does not match (i.e., is not identical, does not correspond) with the source address of the network module. In case the source address of the data package matches (i.e., is identical, corresponds) with the source address of the network module, the data package originates from the network module itself. Hence, it may be assumed that the data package completely passed an entire run through the ring. Hence, a copy of the data package may be generated for further usage at the network arrangement to which the data package was directed. Preferably, only part of the data package is to be read for verification of the source address. This has the advantage that the data packages can be forwarded quickly for reaching the destination address.

According to a further embodiment of the network module, the processor is further configured to determine if the received data package is complete and/or has a defect. According to a further embodiment, the processor is furthermore configured to provide the data package with a defect flag if the determination results in that the data package is incomplete or has a defect. This has the advantage that data packages which are incomplete or have another defect can be identified quickly and can be processed accordingly by the respective network device on the ring structure.

According to a further embodiment of the network module, the processor is furthermore configured to discard a received data package if it is determined that the data package comprises a defect flag. This has the advantage that defective data packages or parts of the data package are removed from the ring structure.

According to a further embodiment of the network module, the processor is furthermore configured to discard a received data package if it is determined that the source address of the data package corresponds to the source address of the network module. This has the advantage that a data package which already passed the ring structure once is removed from the data stream of the ring structure. Hence, the bandwidth of the ring structure may be used more effective.

According to a further embodiment of the network module, the processor is furthermore configured to receive a data package segment from an application and to generate a data package. The data package comprises the data package segment, the source address of the network module, a destination address and an identification number. This has the advantage that the processor undertakes the task of generating the data package and transmission of the data may happen more effective.

According to a further embodiment of the network module, the processor is furthermore configured to make (i.e., create or generate) a copy of the generated data package. This has the advantage that a redundant data package is made, wherein both data package, i.e., the data package itself and the copy of the data package, may be sent redundantly and independent of each other via the ring structure to the destination address.

According to a further embodiment of the network module, the processor is furthermore configured to buffer the received data package segment and/or the generated data package and/or the copy of the generated data package in a memory. When sending data packages via the ring structure, the generated data package or even multiple generated data packages are not forwarded until a free segment reserved for the sending network module in the data stream at the ring structure is freely available, for example. This has the advantage that data packages may be furthermore generated even if the generated data packages cannot be further sent, yet.

According to a further embodiment of the network module, the processor is furthermore configured to send the generated data package and the copy of the generated data package via the first or the second network interface to the ring structure. The data packages are sent to the destination address via the ring structure in different directions. This has the advantage that the data packages, i.e., the data package itself and the copy of the data package, can be sent to the destination address via the ring structure redundantly and independent of each other.

According to a further embodiment of the network module, the processor is furthermore configured to send the generated data package and the copy of the generated data package according to a predefined sending pattern. Due to the sending pattern, a specific region at the data stream is assigned to each network arrangement. This has the advantage that the available bandwidth may be used effectively.

According to a further embodiment of the network module, the data package segment is a UDP (User Datagram Protocol) package. According to other embodiments, the data package segments may also correspond to other data protocol guidelines. This has the advantage that the network module is not limited to a specific type of protocol and may be used flexibly depending on the requirement of the application bound to the network module.

According to a further embodiment of the network module, the ring structure is of a HSR (High-availability Seamless Redundancy Protocol) topology. This has the advantage that data packages may be transmitted in a redundant manner with a data network based on the HSR-topology.

According to a further embodiment of the network module, the application receives and/or provides data according to the ADFX (Avionics Full Duplex Switched Ethernet) protocol. This has the advantage that the network module is compatible with existing ADFX applications and thereby, however, has a higher transmission rate.

Furthermore, a method for receiving data packages from a network arrangement is provided. The network arrangement is provided in a network with ring structure. The data package comprises at least one data package segment, a source address, a destination address and an identification number. The method comprises the step of receiving data packages via a first or a second network interface from the ring structure. Furthermore, the method comprises the step of determining, based on the destination address, if data packages received with the first and/or the second network interface are directed to the network module. The method further comprises the step of determining if the source address and/or the destination address are contained in a predefined list of the network participants. The method further comprises the step of determining, based on the source address and the identification number of the data package, if a copy of a data package directed to the network module is already created in a memory. The method further comprises the step of creating a copy of the data package, of the source address and of the identification number of the data package in the memory if the determination results in that the received data package is directed to the network module and a copy of the data package has not yet been created in the memory. The method further comprises the step of unpacking the data package segment comprising at least one header and a payload from the created copy of the data package. The method further comprises the steps of providing the data package segment to an application.

Furthermore, a method for sending data package segments from an application via a network module to a network arrangement in a ring structure is provided. The method comprises the step of receiving the data package segment comprising at least one header and a payload. Furthermore, the method comprises the step of generating a data package, wherein the data package comprises the data package segment, the source address of the sending network module, a destination address of the network arrangement and an identification number. Further, the method comprises the of making a copy of the generated data package. Further, the method comprises the step of sending the generated data package and the copy of the generated data package via a first or a second network interface of the network module to the ring structure according to a predefined sending pattern.

A data transmission of multiple Gigabit (GBit) from application to application, i.e., originating from the application via the network module and the ring structure to a further network arrangement with an application bound thereto, may be achieved by the device or method described herein. The method for sending or the method for receiving data has a data transmission rate between 1 GBit/s and 200 GBit/s, preferably between 5 GBit/s and 100 GBit/s, especially preferred 10 GBit/s. A multiple of the previously mentioned transmission rates may be achieved as a result of a redundant design of the network device comprising multiple of the network modules described above.

BRIEF DESCRIPTION OF THE DRAWINGS

In general, same reference signs refer to the same elements in the various views shown in the drawings. The drawings are not necessarily true to scale; however, in general importance is attached to illustration of the principles of the invention. In the following description, various embodiments of the invention are described with reference to the following drawings in which.

DETAILED DESCRIPTION

Figure 1:
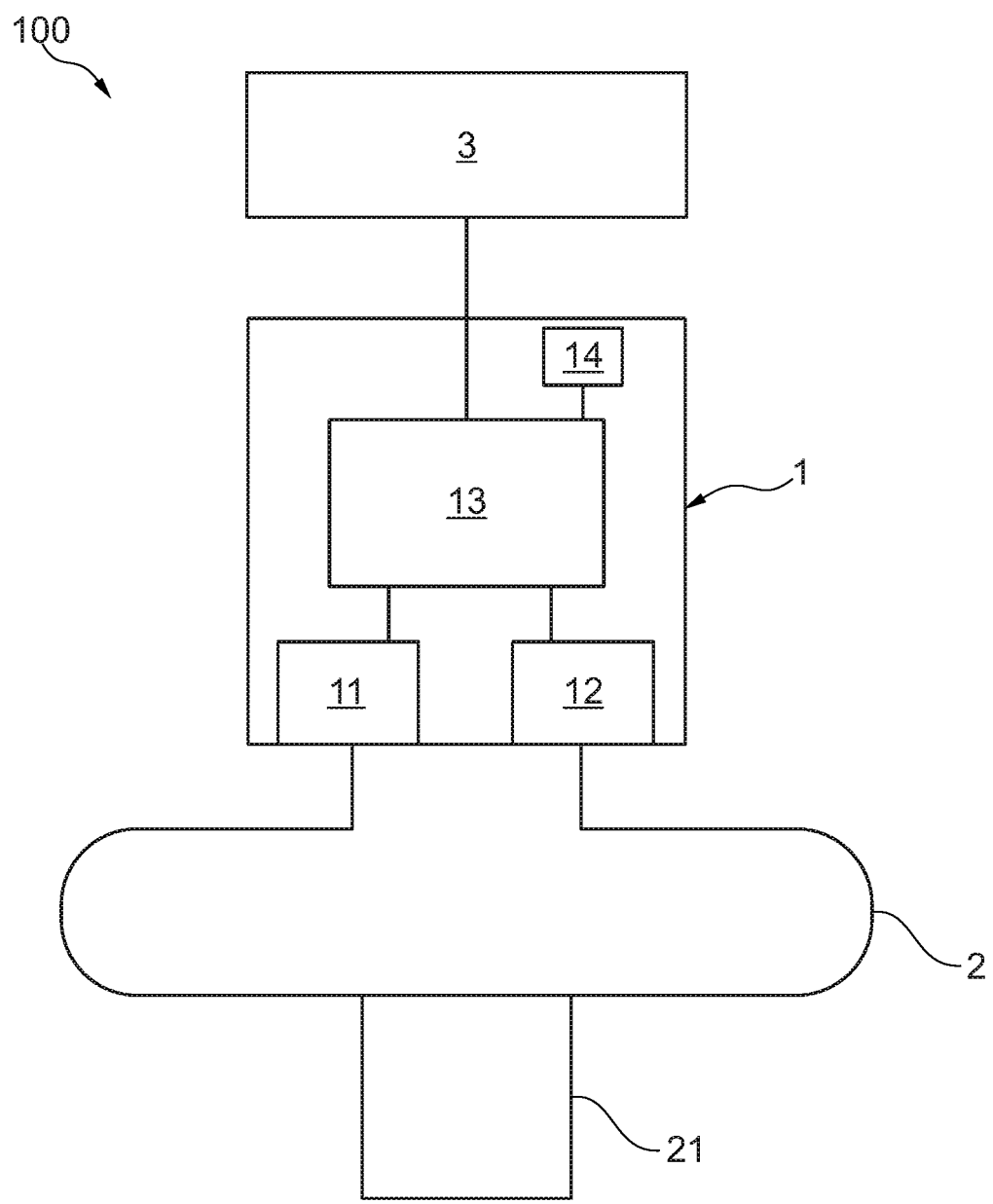
FIG. 1 shows the design of a first embodiment of the network module in a network.

The following detailed description refers to the attached drawings which show, for the purpose of explanation, specific details and embodiments in which the invention may be practiced.

Herein, the word "exemplary" is used with the meaning of "as an example, case or for the purpose of illustration". Each embodiment or design which is described herein as "exemplary" is not necessarily to be interpreted as preferred or advantageous compared to other embodiments or designs.

In the following detailed description, reference is made to the attached drawings which are part of the description and in which specific embodiments are shown for illustration, in which embodiments the invention may be exercised. In this regard, directional terminology as, for example, "on top", "in front", "behind", "anterior", "posterior", etc., are used with reference to the orientation of the described drawing(s). The directional terminology serves for illustration and is in no way limiting as components of embodiments may be positioned in numerous different orientations. It should be understood that other embodiments may be used and structural or logical modifications may be made without departing from the scope of the present invention. It should be understood that the features of the various exemplary embodiments described herein may be combined with each other, as long as not specifically indicated to the contrary. Hence, the following detailed description is not to be understood in a limiting sense and the scope of the present invention is defined by the appended claims.

In the context of this description, the terms "linked", "connected" and "coupled" are used for describing a direct as well as an indirect link, a direct or indirect connection as well as a direct or indirect coupling. Identical or similar elements are provided with identical reference signs in the drawings, as far as this is appropriate.

If not specifically indicating a chronological or functional sequence, the steps of the present invention may be carried out in almost any desired order without departing from the principles of the invention. If it is indicated in a claim that a step is carried out initially and then multiple other steps are carried out one after the other, this is to be understood such that the first step is carried out prior to all other steps while the other steps, however, may be carried out in any desired and suitable order, as long as no order is indicated for the other steps. Parts of claims in which, for example, "step A, step B, step C, step D and step E" are indicated are to be understood such that step A is carried out first and step E is carried out last and the steps B, C and D may be carried out in any desired order between the steps A and E and that the order falls within the scope of the formulated scope. Furthermore, indicated steps may be carried out at the same time if no explicit wording in the claim states that they are to be executed separately. For example, a step for carrying out X in the claim and a step for carrying out Y in the claim may be carried out at the same time during a single process and the process resulting thereof falls within the formulated scope of the claimed method.

FIG. 1 shows the design of a first embodiment of the network module 1 in a network 100. The network module 1 is arranged in a network 100 with ring structure 2 for exchange of data with at least one further network arrangement 21. The network module 1 comprises a first network interface 11 for receiving and/or sending of data packages or bits via the ring structure 2. Furthermore, the network module 1 comprises a second network interface 12 for receiving and/or sending of data packages or bits via the ring structure 2. The data packages (not shown) comprise at least one data package segment, a source address, a destination address and an identification number. The network module 1 further comprises a processor 13. The processor 13 is configured to determine, based on the destination address of the data package or of the header of the data package, if data packages received with the first network interface 11 and/or the second network interface 12 are directed to the network module 1. The processor 13 is further configured to determine if the source address and/or the destination address are contained in a predefined list of the network participants. The predefined list of the network participants is deposited in a memory 14. The processor 13 is further configured to determine, based on the source address and the identification number of the data package, if a copy of a data package directed to the network module 1 is already created in the memory 14. The memory 14 may be designed as a single memory element with multiple memory areas as shown in FIG. 1 or may be designed as multiple memory elements, each of which with one or multiple memory areas. The processor 13 is further configured to create a copy of the data package as well as the source address and the identification number in the memory 14 if the determination results in that the received data package is directed to the network module 1 and a copy of the data package has not yet been created in the memory 14. The processor 13 is further configured to unpack the data package segment comprising at least one header and a payload from the created copy of the data package. The processor 13 is further configured to provide the unpacked data package segment to an application 3 or program connected with the network module 1.

Figure 2:
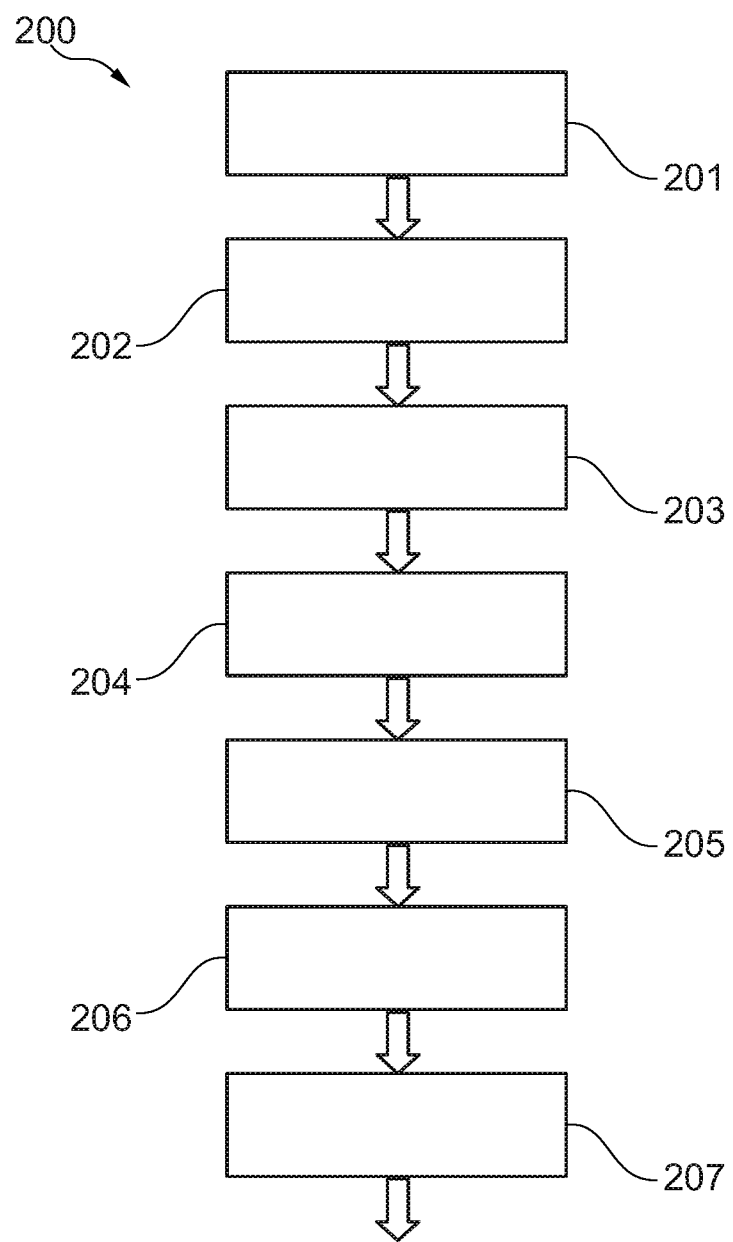
FIG. 2 shows a flow chart of an embodiment of the method for receiving data.

FIG. 2 shows a flow chart 200 of an embodiment of the method for receiving of data packages from a network arrangement that is provided in a network with ring structure wherein the data package comprises at least one data package segment, a source address, a destination address and an identification number. In step 201, data packages are received via a first or a second network interface from the ring structure. In steps 202 it is determined, based on the destination address, if data packages received with the first and/or the second network interface are directed to the network module. In step 203 it is determined if the source address and/or the destination address are contained in a predefined list of the network participants. In step 204 it is determined, based on the source address and the identification number of the data package, if a copy of a data package directed to the network module is already created in a memory. In step 205, a copy of the data package, of the source address and of the identification number of the data package is created in the memory if the determination results in that the received data package is directed to the network module and a copy of the data package has not yet been created in the memory. In step 206, the data package segment comprising at least one header and a payload is unpacked from the created copy of the data package. In step 207, the data package segment is provided to an application connected with the network module.

Figure 3:
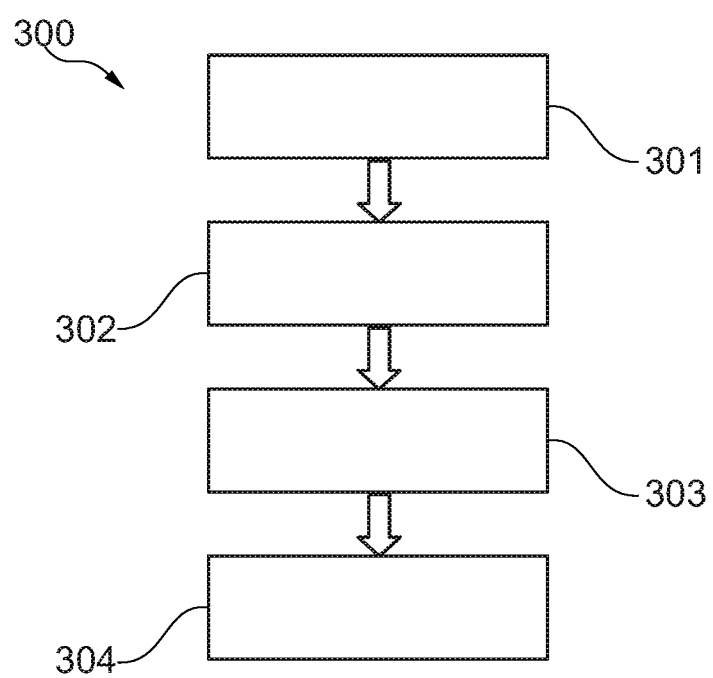
FIG. 3 shows a flow chart of an embodiment of the method for sending data.

FIG. 3 shows a flow chart 300 of an embodiment of the method for sending of data package segments from an application via a network module to a network arrangement in a ring structure. In step 301, data package segments comprising at least one header and a payload from an application are received. In step 302, a data package is generated, wherein the data package comprises the data package segment, the source address of the sending network module, a destination address of the network arrangement and an identification number. In step 303, a copy of the generated data package is created. In step 304, the generated data package and the copy of the generated data package are sent via a first or a second network interface of the network module to the ring structure according to a predefined sending pattern.

Figure 4:
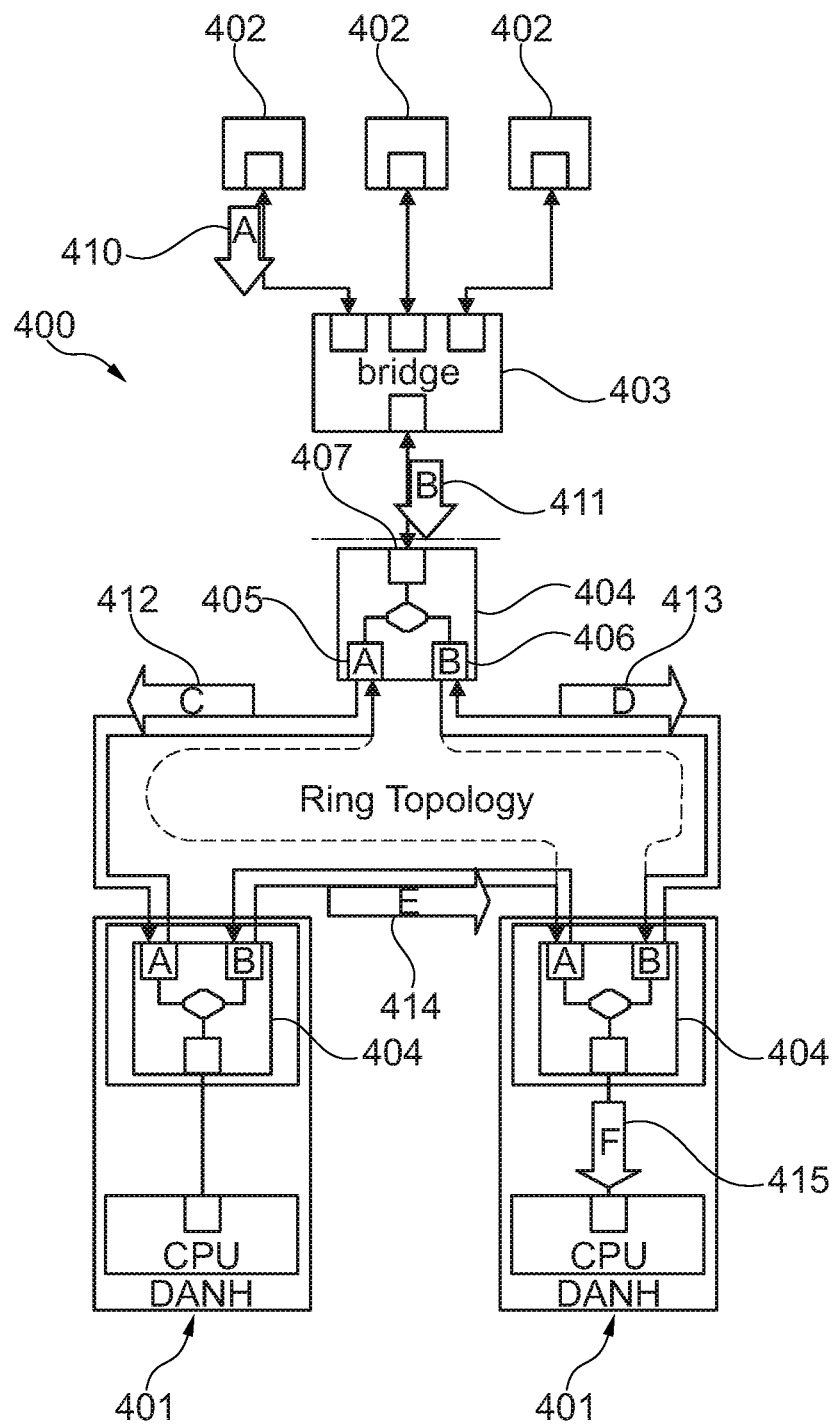
FIG. 4 shows the design of an embodiment of the network with ring structure.

FIG. 4 shows the design of an embodiment of the network 400 with ring structure. In the shown embodiment, the network 400 is designed as a simple HSR network with two DAN (Dual Attached Node) network arrangements 401 and three SAN (Single Attached Node) network arrangements 402 each of which is connected to the network 400 via a network module 404 as exemplarily described in FIG. 1. In the shown embodiment, a DAN network arrangement 401 is directly connected to the ring structure via a network module 404, i.e., connected with the ring structure via two network interfaces. Multiple SAN network arrangements 402 are connected via a network bridge 403 to a network module 404 via an interlink network interface 407, for example. The network module 404 itself is connected to the ring structure via two network interfaces 405, 406. FIG. 4 exemplarily shows a data transfer from one of the SAN 402 to the DAN 401 being arranged at the right. The SAN 402 sends a data package (A-frame 410) via the bridge 403 to the interlink connector 407 of the network module 404 (B-frame 411). The network module 404 equips the data package with a HSR tag as to identify duplicates and sends the generated data package and a copy of the generated data package via the respective network interfaces 405, 406 (C-frame 412 and D-frame 413). The left DAN 401 is neither the source nor the destination and, hence, forwards the C-frame 412 from its first network interface to its second network interface (E-frame 414). The DAN 401 arranged at the right receives two identical data packages (D-frame 413 and E-frame 414) via its both network interfaces within a specific time interval and removes the HSR header of the first data package prior to the data package being further processed (F-frame 415). The copy of the data package or the data package which is arriving later is discarded. The continuous and the dashed line show the redundant ways of the data transmission.

A unicast data transmission is shown in the exemplary embodiment shown in FIG. 4. A receiving node of a unicast data package does not forward the data package. If the network module sends a multicast data package, the data package is forwarded by all of the network modules being arranged in the network until the data package arrives at the source again. The network module being addressed as the actual destination creates a copy of the data package before it is forwarded at the ring as to further process the data package. Then, the source (sender) removes the data package from the ring, which data package the source sent over the ring structure before.

Figure 5:
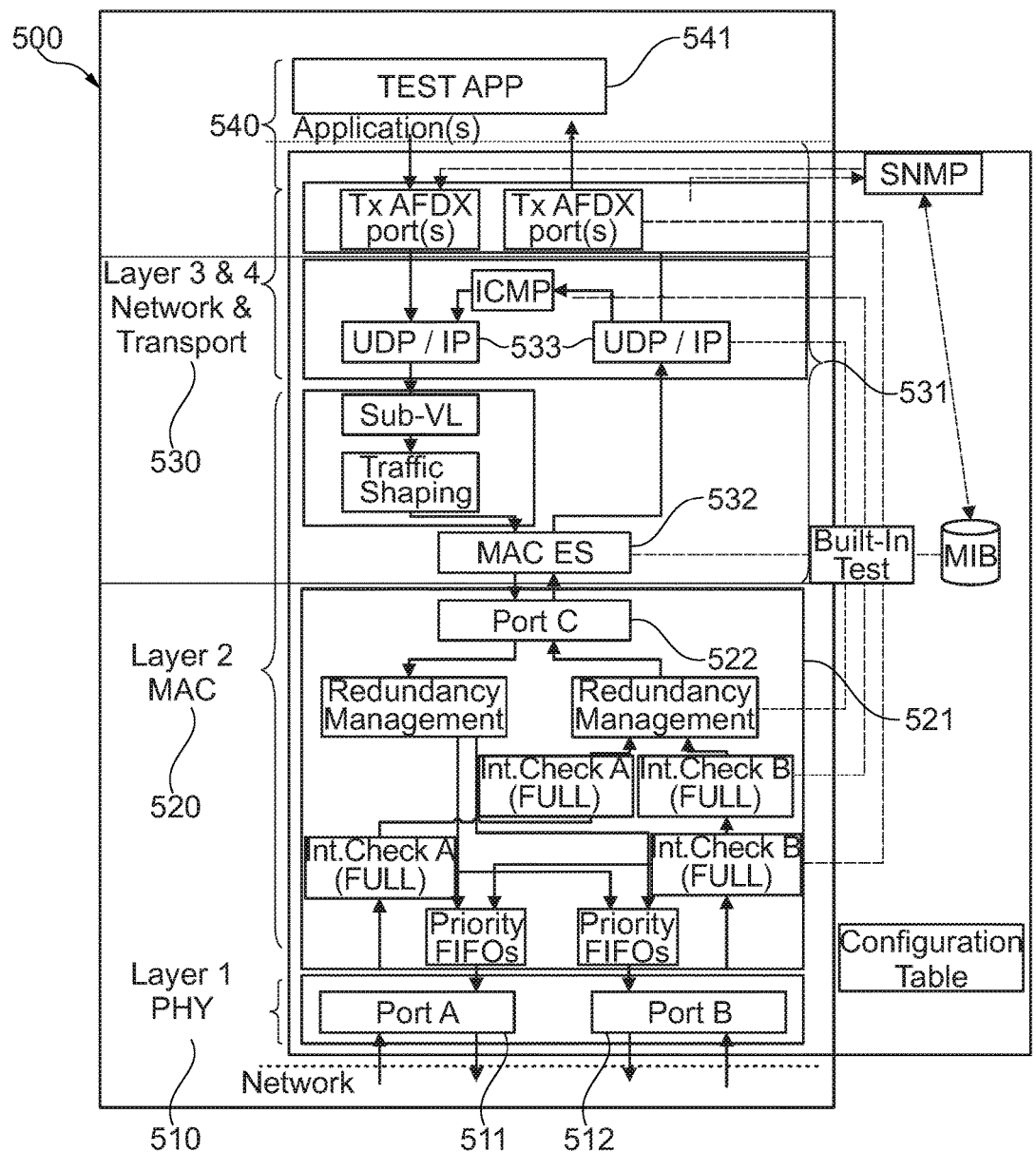
FIG. 5 shows the design of an embodiment of the network module in detail.

FIG. 5 shows the design of an embodiment of the network module 500 in detail. The individual components of the network module 500 are described in detail in the FIGS. 6 and 7. Thereby, FIG. 5 shows which components of the network module 500 are responsible for specific layers according to the OSI layer model. For the physical layer 510 (layer 1 Phy), the network module 500 comprises two network connectors 511, 512 (port A, port B) which serve for communication of the network module 500 with the previously described ring structure. The data link layer 520 (layer 2 MAC) is covered by that section of the network module 500 which is arranged between the network connectors 511, 512 and the blocks 533 for processing of the UDP/IP packages. Thereby, the section from the network connectors 511, 512 up to the interlink connector 522 (port C) is further described in greater detail in FIG. 7. The network layer and the transport layer 530 (layer 3 & 4 network & transport) is covered by the section from the blocks 533 for processing of the UDP/IP packages up to the transition to the application 541 (application). The section from the interlink transition module 532 (MAC ES) up to the transition to the application (541) is further described in detail in FIG. 6. Here, the application oriented layers 540 (session layer, presentation layer and application layer) are not part of the network module 500 and are taken over by the application or applications 541 being connected with the network module 500.

Figure 6:
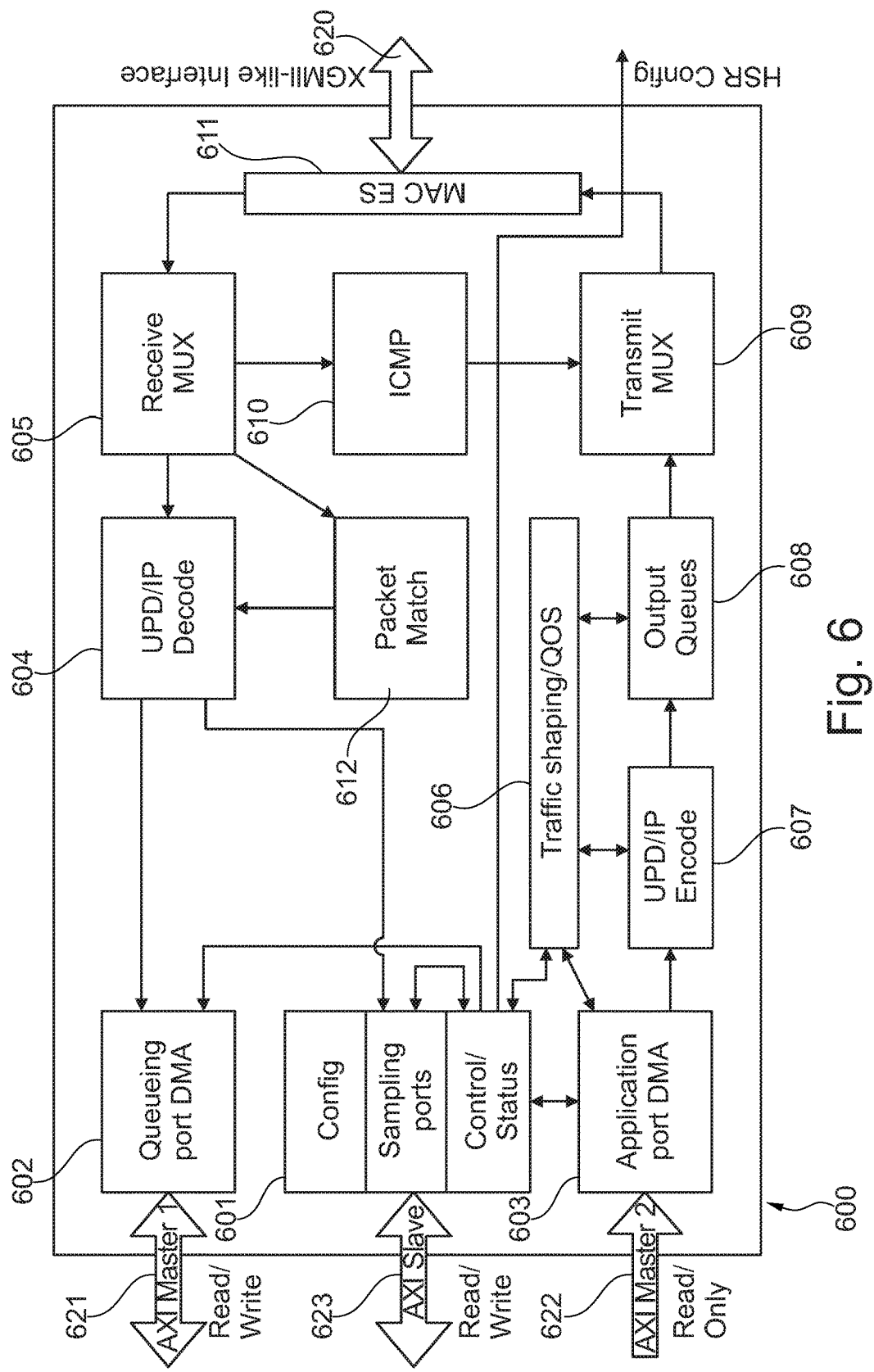
FIG. 6 shows the design of a part of an embodiment of the network module in detail.

FIG. 6 shows the design of a first section 600 of an embodiment of the network module 1 in detail. The first section 600 relates to those components of the network module 1 which process data packages corresponding to parts of the second, the third, and fourth layer according to the OSI reference model. The second layer is the data link layer. The third layer is the network layer and the fourth layer is the transport layer. The components of the first section 600 of the network module 1 shown in FIG. 6 are firmware blocks or firmware modules which may be carried out by one or multiple processors of the network module 1.

The firmware block 601 comprises configuration registers, sampling connectors, a control or status register for the queueing connectors and the application connectors, and the MIB status register. The firmware block 601 represents the AXI slave interface 623. All internal registers and the data of the sampling connectors may be accessed via the AXI slave interface 623.

The firmware block 602 represents a master AXI interface 621 which processes the DMA (direct memory access—direct data access) via the queueing connector and the package handling. Queueing connector data are written to the system memory via the master AXI interface 621. Those memory blocks which are accessible via the queueing connectors are defined by the configuration registers in the firmware block 601.

The firmware block 602 receives its input data for the firmware block 604, maps the data to the corresponding queueing connectors and processes the DMA transfer of the data into the cache via the AXI master interface. The AXI master interface 521 is used for read and write operations, wherein the relevant function requires only the writing mode. After providing the data to the system memory, a single reading access is required for updating the status register after the data to be written are handed over to the AXI master interface 621. If the reading data are returned it is ensured by the intermediate bus system that the data to be written have been delivered (read and write posting rules, according to which a reading access must not circumvent a writing access). This behavior is required as to ensure that the data which are transmitted in the status register of the queueing connectors to the application reflect the correct information which stands by in the system memory and as to avoid race conditions.

The firmware block 603 represents a master AXI interface 622 which processes the DMA for the forwarding via the application connector. The data to be transmitted may be read from the system memory via the master AXI interface 622. Those memory blocks which are accessible via the interface are defined by the configuration registers of the application connectors in the firmware block 601. Planing of the DMA transmission is handled by the firmware block 606. The firmware block 603 further handles the AXI bus master transactions and provides the package data to the UDP/IP encoder block 607.

The firmware block 604 implements a UDP/IP decoder functionality. Here, a UDP checksum of the received data is verified and the necessary information for the further processing of the data are read out. The data are forwarded to the sampling and queueing connector firmware blocks 601 and 602. The firmware block 604 provided the data in two separated data streams. The first data stream used only the UDP payload and provides the data to the sampling and queueing connector. The second data stream used the entire Ethernet package and provides the data only to the queueing connector as to enable recording of the entire Ethernet package upon request.

Each of the data packages is equipped with routing information which are provided by the firmware block 612. The routing information specify the destination connectors of the package.

The firmware block 605 processes the package receipt and the forwarding to the corresponding processing blocks. For the network module described herein, the ICMP-packages are forwarded to the firmware block 611 (ICMP) while all other packages are forwarded to the firmware block 603 (IDP/IP decoding). The packages are also forwarded to the firmware block 612 (package match) at which the data of the package header which contain information about the destination connectors are compared with the setting of the sampling and queueing connectors. The package forwarding happens at an early stage without consideration of the frame verification sequence.

The firmware block 606 processes the AFDX determinism and the chronological package assignment. Furthermore, the firmware block 606 handles the network traffic shaping and the quality of service (QoS) of the transmission path. The firmware block 606 plans the reading access of the DMA of the application connector (firmware block 603), provides additional information for the Ethernet/IP/UDP header and handles the controlling of the transmission queue. Furthermore, the timing of the packages to be transmitted and the bandwidth limitation which is predefined in the configuration of the virtual links are implemented by the firmware block 606.

The firmware block 607 (UDP/IP encode) processes the data of the application connector and generates the UDP package therefrom. The firmware block 607 further processes the generation of Ethernet, IP, and UDP packages. Furthermore, the IP/UDP checksum is calculated in the firmware block 607 and the received data are partitioned in separate IP packages, if necessary. The package data are received by the firmware block 603 (application port DMA) and forwarded to the firmware block 608 (output queue).

The firmware block 608 provides the output queue for the individual virtual links. The firmware block 608 stores the output of the firmware block 607 (UDP/IP encode).

The data path from the firmware block 603 (application port DMA) via the firmware block 607 (UDP/IP decode) is able to process the data packages in a serial manner. The output is buffered or cached in the firmware block 608 (output queue) for the transmission over the network.

The firmware block 608 is controlled by the firmware block 606 (traffic shaping/QOS) which provides the necessary information as to chronologically control the output of the individual buffered data packages.

The firmware block 609 (transmit MUX) multiplies data packages from the firmware block 608 (output queue) and from the firmware block 610 (ICMP). The firmware block 609 is able to multiply the data packages to be transmitted from a multitude of inputs, wherein at the depicted embodiment the data packages originate only from the firmware block 608 (output queue) and from the firmware block 610 (ICMP). The data packages are transmitted either according to their priority or, in case the data packages are of the same priority, according to the round-robin method, i.e., the data packages from the firmware block 608 (output queue), for example, and from the firmware block 610 (ICMP) are transmitted alternately.

The firmware block 610 (ICMP) processes ICMP (Internet Control Message Protocol) message packages and generates the corresponding answers thereto. On of the most known ICMP packages which is supported is the ECHO package which is used for calling (ping) at hosts.

Figure 7:
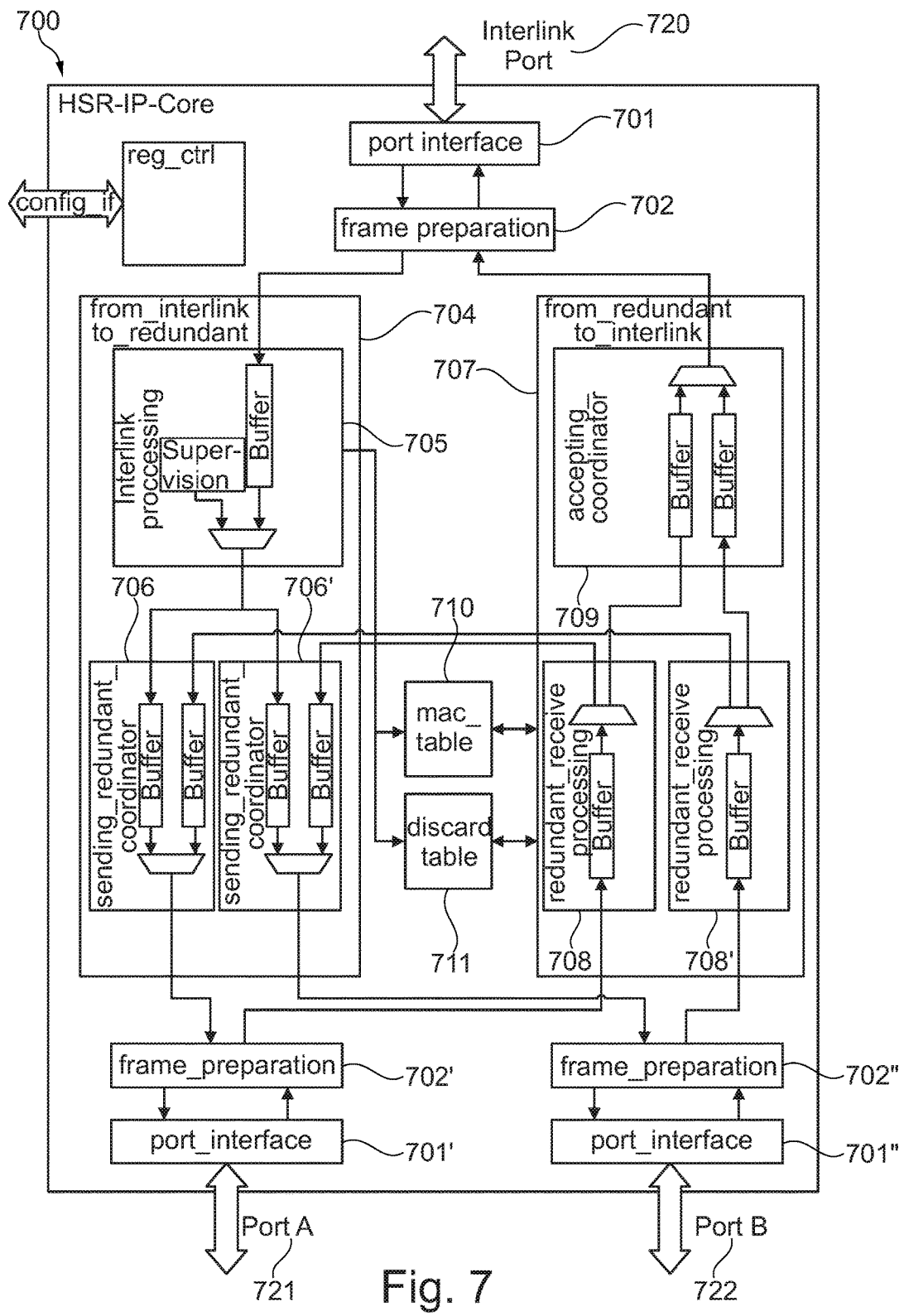
FIG. 7 shows the design of a further part of an embodiment of the network module in detail.

The firmware block 611 (MAC ES) provides the XGMII (10 Gigabit media independent interface) connection 620 to the further partial module of the network module 1 which is depicted in FIG. 7. When viewed externally, the connection 620 acts like a MAC-layer interface. The receiving and sending path are processed separate from each other and do not have an internal connection. The receiving path verifies the checksum of the data package, removes the Ethernet header from the data segments (including the checksum) and provided a defect indicator at the package end. The sending path adds the Ethernet header and the checksum. The network module 611 generates the XGMII-like output signals.

The firmware block 612 (package match) compares the data packages with the values from the queueing connector or the sampling connector, respectively. The firmware block 612 compares the incoming data packages with the configuration information of the queueing or sampling connector, respectively, and provides the routing information for the firmware block 604 (UDP/IP decode).

In the depicted embodiment, the interface 620 uses only simple signal rates with the same clock rate as the XGMII signal, while, however, the number of the data channels is doubled. The data channels 0 to 31 transmit the first data values (transmitted at the first active clock impulse), whereas the data channels 32 to 63 and the corresponding control channels 4 to 7 transmit the second data values (transmitted at the second active clock impulse). The interface 620 is used for receiving as well as for sending data. Every interface 620 uses its own clock signals. For example, the clock generator for the receiver side may be used for the sender side as well.

The interface 621 (AXI master interface 1) is represented by the firmware block 602. The interface 621 provides access to the system memory and is used for read and write accesses. The interface 621 implements the interface to the firmware block 602 (Queueing port DMA). For example, the interface is connected with an external communication block via a PCIe-bus. For example, the interface is an AXI4 master interface with a 64 bit data bus. For example, burst transactions are implemented and used on the data bus.

The interface 622 (AXI master interface 2) is represented by the firmware block 603. The interface 622 provides an access to a system memory and is used for read access only in the depicted embodiment of the network module 1. Here, the write access is set to unused, wherein the signal values are set to idle values. The interface 622 represents the firmware block 603 (application port DMA). For example, the interface is connected with an external communication block via a PCIe bus. For example, the interface is an AXI4 master interface with a 64 bit data bus. For example, burst transactions are implemented and used on the data bus.

The interface 623 (AXI slave interface) is represented by the firmware block 601. The interface 623 provides an access to internal registers of the network module 1 and to memory for any system components. For example, the interface is connected with an external communication block via a PCIe-bus. For example, the interface is an AXI4 master interface with a 64 bit data bus. For example, burst transactions are implemented and used on the data bus.

The interface 620 (XGMII like Ethernet interface) uses a modified XGMII-interface in the depicted embodiment. For example, the modifications introduced here map the implementation of the interface to an FPGA-chip at which the initial XGMII specification relating to double data rates are not feasible and are not supported by the used chip architecture, for example.

The self-learning elements are replaced by a predetermined list as to implement the determinism of the used communication protocol. For example, information which are not predetermined by the network protocol of the ring structure are predetermined by the network module.

FIG. 7 shows the design of a second section 700 of an embodiment of the network module 1 in detail. The second section 700 relates to those components of the network module 1 which process data packages corresponding to the first and parts of the second layer. The first layer is the physical layer. The second layer is the data link layer. The components of the second section 700 of the network module 700 shown in FIG. 7 are firmware blocks or firmware modules which may be carried out by one or multiple processors of the network module 1.

The firmware blocks 701, 701', 701" (port_interface) transform the XGMII interface into an internal interface which can be used by the processor of the network module 1. A clock domain crossing (CDC) between the XGMII clock and the internal clock is achieved as a result of FIFO accesses in the data path.

The firmware blocks 702, 702', 702" (Frame_preparation) receive or send data packages from or to, respectively the firmware block 701, or 701', 701", respectively. The CRC (cyclic redundancy check) information of the FCS (frame check sequence) data package field are verified when receiving. Furthermore, the SOF (start of frame) signal before the first byte of the destination address and the EOF (end of frame) signal at the end are generated. Thus, the preamble (also referred to in this description as opening field) is not lead via the processor. Additionally, the firmware block 702 verifies the maximally supported Jumbo data package length of 4 Kbyte (HSR LSDU size 12 bit), for example, and the minimum Ethernet package length of 65 Byte. The firmware block sets a defect flag in case of a too short or too large package size or in case of a CRC error. The defect flag is part of the EOF signal. The firmware block 702', 702" adds the preamble at the beginning of the data package when sending.

The firmware block 704 (from_interlink_to_redundant) contains the blocks or modules which form the path from the interlink connector 720 to the redundant connectors 721, 722 (to the ring structure). These blocks or modules are described in the following.

The firmware block 705 (interlink_processing) is responsible for receiving and storing of data packages which are received via the interlink connector 720. Furthermore, the firmware block 705 is responsible for collecting information about the received data packages, for the modification of the data packages by adding a HSR tag and for doubling the data packages. Additionally, the firmware block 705 adds supervision data which are to be sent periodically via the two ring structure connectors 721, 722. The data package is removed by the firmware block 705 in case a defect flag was set in the firmware block 702 (frame_preparation).

The firmware blocks 706, 706' (sending_redundant_coordinator) processes the access to the redundant network connectors 721, 722. The firmware blocks 706, 706' control and multiplex the transmission of the data packages which come from the interlink connector 720 and from the first or second redundant connector 721, 722. Forwarded data packages which come from the first or second redundant connector 721, 722 have priority over those data packages which come from the interlink connector 720. For this purpose, the firmware blocks 706, 706' buffer these data packages, i.e., the data packages which come from the interlink connector 720. Due to this prioritization, data packages which are not directed to the network module 1 but to another network arrangement in the ring structure may be forwarded quicker to the destination address.

The firmware block 707 (from_redundant_to_interlink) comprises those blocks or modules which form the path from the redundant connectors 721, 722 to the interlink connector 720. These blocks or modules are described in the following.

The firmware blocks 708, 708' (redundant_receive_processing) receive data packages from the redundant connectors 721, 722 and collect information (for example source address, destination address, and sequence number) of the received data packages. The collected information is compared with the data in the suspend (discard) table 711 and MAC table 710. The suspend table 711 and the MAC table 710 are described in the following. The data packages are either forwarded, i.e., to the interlink connector 720 or to the further redundant connector 721 or 722 or discarded depending on the result of the comparison. For example, the data packages are buffered in a ring buffer during the verification. The firmware blocks 708, 708' remove the header (for example the HSR header) from the ring structure, too, if necessary. If the network module 11 receives its own supervision packages it is verified if the supervision package was received by both redundant connectors 721, 722. The information about this is stored in a register, just for the case of a defect.

In case an EOF signal with a defect flag at the end of the data package is received, the entire data package in the buffer is discarded. Due to the handing through principle applied here, i.e., the data are forwarded before the end of the data package is received, it may happen that a part of the data package has already been forwarded when a defect flag is detected. In this case, only those data which are still in the buffer are cut off and the defect flag is set for the forwarded data package.

The firmware block 709 (accepting_coordinator) is assigned with the task of buffering the data package and handling the access to the interlink connector 720. The firmware block 709 controls and multiplexes the transmission of the data packages which come from both redundant connectors 721, 722 for the interlink connector 720.

The MAC table 710 (mac_table) is assigned with the task of storing the MAC addresses of those nodes which are connected to the interlink connector 720. There is a common MAC table for all connectors (720, 721, 722) so that search requests may be bundled. Thus, all requests as well as the search addresses may be stored up to processing.

The suspend (discard) table 711 (discard_table) is assigned with the task of taking a protocol of the double or circulating data packages, based on which protocol it can be decided whether a data package can be discarded or is to be forwarded. In the table, the double source MAC address and a sequence number (for example HSR sequence number) are stored, which may, in combination, unambiguously identify each received data package and based on which is may be decided whether or not a data package has been received already.

Even though the invention was shown and described in particular with reference to specific embodiments, it should be understood by those familiar with the technical field that numerous modifications with respect to design and details may be made without departing from the spirit and scope of the invention as defined by the appended claims. Hence, the scope of the invention is defined by the appended claims and it is, thus, intended that any modifications which fall under the wording or the equivalence range of the claims are covered.

LIST OF REFERENCE SIGNS 1 network module
11 first network interface
12 second network interface
13 processor
14 memory
2 ring structure
21 network arrangement
3 application
200 method
201-207 method steps
300 method
301-304 method steps While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A network module for sending and/or receiving of data packages from a network arrangement provided in a network with a ring structure, wherein each of the data packages comprises at least one data package segment, a source address, a destination address and an identification number, the network module comprising:
a first network interface for receiving and/or sending of data packages via the ring structure;
a second network interface for receiving and/or sending of data packages via the ring structure;
a processor configured to determine, based on the destination address, if data packages received with the first network interface and/or the second network interface are directed to the network module and to determine if the source address and/or the destination address are contained in a predefined list of network participants,
wherein the processor is further configured to determine, based on the source address and the identification number, if a copy of a data package directed to the network module is already created in a memory,
wherein the processor is further configured to create a copy of the data package as well as the source address and the identification number in the memory if the determination results in that the received data package is directed to the network module and a copy of the data package has not yet been created in the memory, and
wherein the processor is further configured to unpack the data package segment comprising at least one header and a payload from the created copy of the data package and to provide the data package segment to an application.

2. The network module of claim 1, wherein the processor is further configured to forward a data package received by the first network interface via the second network interface on the ring structure and/or to forward a data package received by the second network interface via the first network interface on the ring structure if it is determined that the source address of the data package does not correspond with the source address of the network module.

3. The network module of claim 2, wherein the processor is further configured to determine if the received data package is complete and/or contains a defect; and is configured to provide the data package with a defect flag if the determination results in that the data package is incomplete or has a defect.

4. The network module of claim 3, wherein the processor is further configured to discard the received data package if it is determined that the data package comprises a defect flag.

5. The network module of claim 2, wherein the processor is further configured to discard the received data package if it is determined that the source address of the data package corresponds with the source address of the network module.

6. The network module of claim 1, wherein the processor is further configured to receive a data package segment from the application and to generate a data package wherein the data package comprises the data package segment, the source address of the network module, a destination address and an identification number.

7. The network module of claim 6, wherein the processor is further configured to create a copy of the generated data package.

8. The network module of claim 6, wherein the processor is further configured to buffer the received data package segment and/or the generated data package and/or a copy of the generated data package in a memory.

9. The network module of claim 7, wherein the processor is further configured to send the generated data package and the copy of the generated data package via the first network interface or the second network interface to the ring structure.

10. The network module of claim 9, wherein the processor is further configured to send the generated data package and the copy of the generated data package according to a predefined sending pattern.

11. The network module of claim 1, wherein the data package segment is a User Datagram Protocol ("UDP") package.

12. The network module of claim 1, wherein the ring structure is of a High-availability Seamless Redundancy Protocol ("HSR") topology.

13. The network module of claim 1, wherein the application receives and/or provides data according to Avionics Full Duplex Switched Ethernet ("ADFX") protocol.

14. A method for receiving of data packages from a network arrangement provided in a network with a ring structure, wherein each of the data packages comprises at least one data package segment, a source address, a destination address and an identification number, the method comprising:
receiving data packages via a first network interface or a second network interface from the ring structure;
determining, based on the destination address, if the data packages received with the first and/or the second network interface are directed to a network module;
determining if the source address and/or the destination address are contained in a predefined list of network participants;

determining, based on the source address and the identification number of the data package, if a copy of a data package directed to the network module is already created in a memory;

creating a copy of the data package, of the source address and of the identification number of the data package in the memory if the determination results in that the received data package is directed to the network module and a copy of the data package has not yet been created in the memory;

unpacking the data package segment comprising at least one header and a payload from the created copy of the data package; and providing the data package segment to an application.

* * * * *